United States Patent
Osagawa et al.

(10) Patent No.: US 10,523,463 B2
(45) Date of Patent: Dec. 31, 2019

(54) COMMUNICATION SYSTEM AND COMMUNICATION METHOD

(71) Applicant: Mitsubishi Electric Corporation, Tokyo (JP)

(72) Inventors: Daisuke Osagawa, Tokyo (JP); Kenichi Iwamatsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/317,848

(22) PCT Filed: Sep. 22, 2017

(86) PCT No.: PCT/JP2017/034355
§ 371 (c)(1),
(2) Date: Jan. 15, 2019

(87) PCT Pub. No.: WO2019/058524
PCT Pub. Date: Mar. 28, 2019

(65) Prior Publication Data
US 2019/0363907 A1    Nov. 28, 2019

(51) Int. Cl.
*H04L 12/28* (2006.01)
*H04L 12/46* (2006.01)
*G06F 9/30* (2018.01)
*H04N 21/454* (2011.01)
*H04L 12/18* (2006.01)

(52) U.S. Cl.
CPC ...... *H04L 12/4604* (2013.01); *G06F 9/30007* (2013.01); *H04L 12/1868* (2013.01); *H04N 21/454* (2013.01)

(58) Field of Classification Search
None
See application file for complete search history.

(56) References Cited

U.S. PATENT DOCUMENTS

2005/0036489 A1    2/2005  Jou et al.
2008/0288591 A1*  11/2008  Tanimoto ............ H04L 12/4604
                                                                 709/205

FOREIGN PATENT DOCUMENTS

JP    10-65706 A      3/1998
JP    2002-164925 A   6/2002
(Continued)

OTHER PUBLICATIONS

International Search Report dated Dec. 19, 2017 for PCT/JP2017/034355 filed on Sep. 22, 2017, 2 page only Japanese.
(Continued)

*Primary Examiner* — Clemence S Han
(74) *Attorney, Agent, or Firm* — Xsensus LLP

(57) ABSTRACT

A communication system includes a plurality of high-performance communication devices located in a first communication network and having a first communication processing performance, and a low-performance communication device located in a second communication network and having a second communication processing performance. A high-performance communication device, which is one of the high-performance communication devices and is located at a boundary of connection with the low-performance communication device, restricts relay of a broadcast frame transmitted and received in the first communication network to the second communication network.

11 Claims, 10 Drawing Sheets

(56) References Cited

FOREIGN PATENT DOCUMENTS

| | | |
|---|---|---|
| JP | 2003-124693 A | 4/2003 |
| JP | 2008-172381 A | 7/2008 |
| JP | 2009-141574 | 6/2009 |
| JP | 2010-28295 A | 2/2010 |
| TW | 200607278 A | 2/2006 |

OTHER PUBLICATIONS

Decision to Grant received for Patent Application 2018-532796 dated Jul. 30, 2018, 4 pages including English translation.
Office Action dated Jun. 14, 2019, issued in corresponding Taiwanese Patent Application No. 107131526 (with English Translation) 28 pages.

* cited by examiner

COMMUNICATION SYSTEM AND COMMUNICATION METHOD

CROSS-REFERENCE TO RELATED APPLICATIONS

The present application is based on PCT filing PCT/JP2017/034355, filed 22 Sep. 2017, the entire contents of which are incorporated herein by reference.

FIELD

The present invention relates to a communication system and a communication method for adjusting the traffic of relayed frames.

BACKGROUND

In some communication systems in which a plurality of communication devices are located, communication devices having high communication processing performance and communication devices having low communication processing performance are both present. In such communication systems, when a low-performance communication device receives broadcast frames, packet drop is likely to occur. It is therefore difficult to include communication devices having different communication performances in a communication system.

In the optical communication system described in Patent Literature 1, a station communication device includes a first subscriber communication device that performs low-speed communication and a second subscriber communication device that performs high-speed communication, and the communication speed with an external network is higher than that of the first subscriber communication device but lower than that of the second subscriber communication device. The station communication device acquires delivery request signal information indicating a multicast signal that a terminal of the first subscriber communication device requests delivery of, and it then transfers the multicast signal to the second subscriber communication device without any condition. In addition, the station communication device transfers the multicast signal to the first subscriber communication device in response to the delivery request signal information. In this manner, the optical communication system described in Patent Literature 1 achieves efficient use of communication bands.

CITATION LIST

Patent Literature

Patent Literature 1: Japanese Patent Application Laid-open No. 2009-141574

SUMMARY

Technical Problem

With the technology of related art described in Patent Literature 1, communication using multicast frames can be performed; however, communication using broadcast frames cannot be performed. The technology of Patent Literature 1 thus has a problem in that it is difficult to improve the communication efficiency.

The present invention has been made in view of the above, and an object thereto is to provide a communication system that can efficiently perform stable communication even though the communication system includes a plurality of communication devices having different communication processing performances.

Solution to Problem

To solve the problem and achieve the object described above, an aspect of the present invention is a communication system that includes: a plurality of first communication devices located in a first communication network and having a first communication processing performance; and a second communication device located in a second communication network and having a second communication processing performance lower than the first communication processing performance. Moreover, in the communication system according to an aspect of the present invention, a boundary device restricts relay of a broadcast frame transmitted and received in the first communication network to the second communication network, the boundary device being one of the first communication devices and being located at a boundary of connection with the second communication device.

Advantageous Effects of Invention

A communication system according to the present invention produces an effect of efficiently performing stable communication even though the communication system includes a plurality of communication devices having different communication processing performances.

DESCRIPTION OF EMBODIMENTS

A communication system and a communication method according to certain embodiments of the present invention will be described in detail below with reference to the drawings. Note that the present invention is not limited to the embodiments.

First Embodiment

Figure 1:
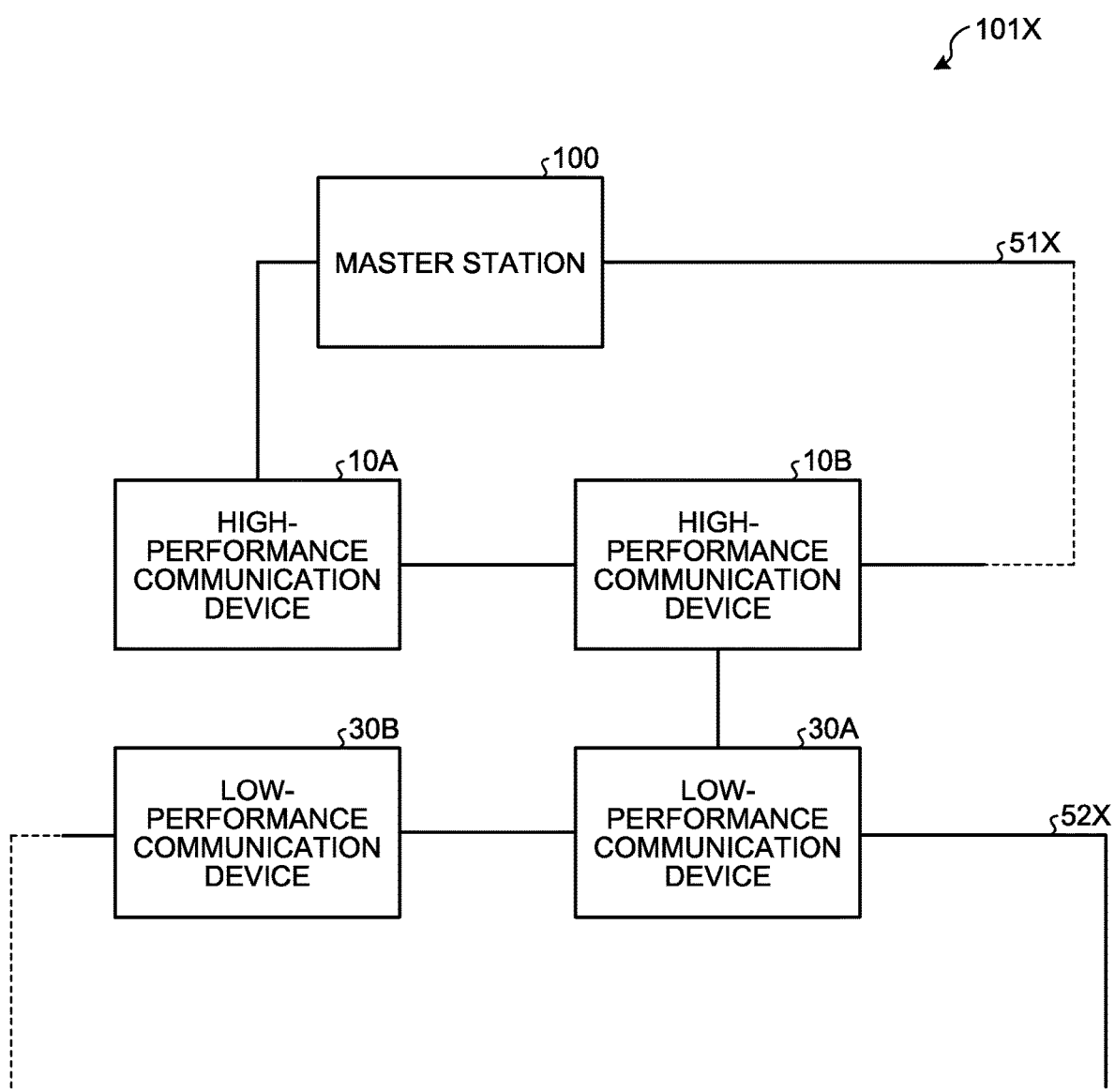
FIG. 1 is a diagram illustrating a configuration of a communication system according to a first embodiment of the present invention.

FIG. 1 is a diagram illustrating a configuration of a communication system according to a first embodiment of the present invention. A communication system 101X includes a communication network 51X, which is a first communication network, and a communication network 52X, which is a second communication network. The communication network 51X includes high-performance communication devices 10A and 10B having high-specification communication processing performance, and a master station 100 that is a key station. The communication network 52X includes low-performance communication devices 30A and 30B having low-specification communication processing performance. The high-performance communication devices 10A and 10B are communication devices that perform communication processing of higher performance than the low-performance communication devices 30A and 30B. Thus, the high-performance communication devices 10A and 10B, which are first communication devices, have high communication processing performance, which is first communication processing performance, and the low-performance communication devices 30A and 30B, which are second communication devices, have low communication processing performance, which is second communication processing performance.

In the communication network 51X, the master station 100 is connected to the high-performance communication device 10A, and the high-performance communication device 10A is connected to the high-performance communication device 10B. Note that the master station 100 may be connected to the high-performance communication device 10A directly or via a relay device such as a hub. In addition, the high-performance communication device 10A may be connected to the high-performance communication device 10B directly or via a relay device.

In addition, the high-performance communication device 10B may be connected to the master station 100. In this case, the high-performance communication device 10B may be connected to the master station 100 directly or via a relay device. In addition, the low-performance communication device 30A may be connected to the low-performance communication device 30B directly or via a relay device.

As described above, in the communication network 51X, the high-performance communication devices 10A and 10B and the master station 100, which is a control station, may be connected to one another in any manner. Furthermore, in the communication network 52X, the low-performance communication devices 30A and 30B may be connected to each other in any manner.

The communication network 51X is connected to the communication network 52X, and the high-performance communication devices 10A and 10B and the low-performance communication devices 30A and 30B are both present in the communication system 101X. In the communication system 101X, the high-performance communication device 10B in the communication network 51X is connected to the low-performance communication device 30A in the communication network 52X. The high-performance communication device 10B is thus a boundary station located at a boundary of connection between a high-performance communication device and a low-performance communication device. Thus, in the communication network 51X, communication devices having different communication processing performances are located on one trunk.

The high-performance communication devices 10A and 10B are communication devices each having a baud rate and communication processing performance that are equal to each other. In other words, the high-performance communication devices 10A and 10B are devices that are capable of processing all data received from other devices. In contrast, the low-performance communication devices 30A and 30B are communication devices each having communication processing performance lower than its baud rate. In other words, the low-performance communication devices 30A and 30B are devices that may not be able to process part of data received from other devices.

The high-performance communication devices 10A and 10B and the low-performance communication devices 30A and 30B each include a microcomputer, and perform communication processing by using firmware. In addition, the high-performance communication devices 10A and 10B each includes a hardware circuit dedicated to communication processing such as an application specific integrated circuit (ASIC). The high-performance communication devices 10A and 10B thus perform communication processing using the firmware and communication processing using the hardware circuits to achieve high-speed communication processing. The high-performance communication devices 10A and 10B are also called hardware stations, and the low-performance communication devices 30A and 30B are also called software stations.

The high-performance communication devices 10A and 10B and the low-performance communication devices 30A and 30B are arranged in a controller such as a programmable logic controller (PLC). The high-performance communication devices 10A and 10B are used for a controller that requires high-speed communication processing. The low-performance communication devices 30A and 30B are used for a controller that only requires communication processing at lower speed than that of the high-performance communication devices 10A and 10B.

The master station 100 is a management device that manages the high-performance communication devices 10A and 10B and the low-performance communication devices 30A and 30B. The master station 100 is a high-performance communication device having functions similar to those of the high-performance communication devices 10A and 10B. The master station 100 is one of the high-performance communication devices in the communication network 51X. In other words, in the communication network 51X, one of the high-performance communication devices becomes the master station 100. In the first embodiment, a case where a high-performance communication device 10C, which will be described later, is the master station 100 will be described. Thus, in the description below, the master station 100 may be referred to as the high-performance communication device 10C. Note that, in the description below, the high-performance communication devices 10A and 10B and the low-performance communication devices 30A and 30B managed by the master station 100 may be referred to as slave stations.

The master station 100 broadcasts a connection request frame requesting the respective slave stations to establish connection. Broadcasting is processing to transmit data simultaneously to all the devices participating in the same network without specifying specific devices. The broadcasting performed by the master station 100 herein is processing to transmit data to all the slave stations in the communication system 101X without specifying addresses of the slave stations. Thus, the master station 100 transmits the same connection request frame simultaneously to the respective slave stations by broadcasting. An example of the connection request frame is Detection frame for acquiring specific information. The master station 100 also receives request response frames, which are responses to the connection request frame, from the respective slave stations. An example of the request response frame is Detection Ack frame. A request response frame includes the station-port information (described later) and this information contains filtering information. The filtering information is information indicating whether broadcast frames can be relayed. In other words, the filtering information is relay capability information indicating whether broadcast frames can be relayed.

The high-performance communication devices 10A and 10B are devices capable of relaying broadcast frames, and the low-performance communication devices 30A and 30B are devices that cannot relay broadcast frames. Thus, the high-performance communication devices 10A and 10B transmit first information, which is filtering information indicating that broadcast frames can be relayed, to the master station 100. In contrast, the low-performance communication devices 30A and 30B transmit second information, which is filtering information indicating that broadcast frames cannot be relayed, to the master station 100.

The master station 100 determines a relay-capability boundary station on the basis of the filtering information received from the respective slave stations. A boundary device, which is a relay-capability boundary station, is a high-performance communication device located at the boundary of a device capable of relaying broadcast frames and a device that cannot relay broadcast frames. Specifically, a relay-capability boundary station is a high-performance communication device connected to either of the low-performance communication devices 30A and 30B. In other words, a relay-capability boundary station is a high-performance communication device connected to the communication network 52X. Note that, in the description below, a relay-capability boundary station will be referred to as a boundary device.

As illustrated in FIG. 1, in the communication system 101X, the high-performance communication device 10B is a boundary station. The master station 100 transmits a first relay setting frame for each port to the boundary station on the basis of the filtering information from the respective slave stations. The first relay setting frame is a frame specifying for each port whether it relays broadcast frames. Specifically, the first relay setting frame specifies a port at which filtering of broadcast frames is to be performed. As described above, the first relay setting frame is a frame instructing a boundary station to restrict relay of broadcast frames. An example of the first relay setting frame is Relay Configuration frame. The first relay setting frame transmitted by the master station 100 specifies that a port connected to the low-performance communication device 30A does not relay broadcast frames transmitted from the master station 100.

In addition, the master station 100 receives a setting acknowledgement frame indicating acknowledgement of the first relay setting frame from the boundary station. An example of the setting acknowledgement frame is Relay Configuration Ack frame. Note that the master station 100 may be located outside the communication network 51X. In addition, four or more high-performance communication devices may be located in the communication network 51X. Furthermore, three or more low-performance communication devices may be located in the communication network 52X.

Figure 2:
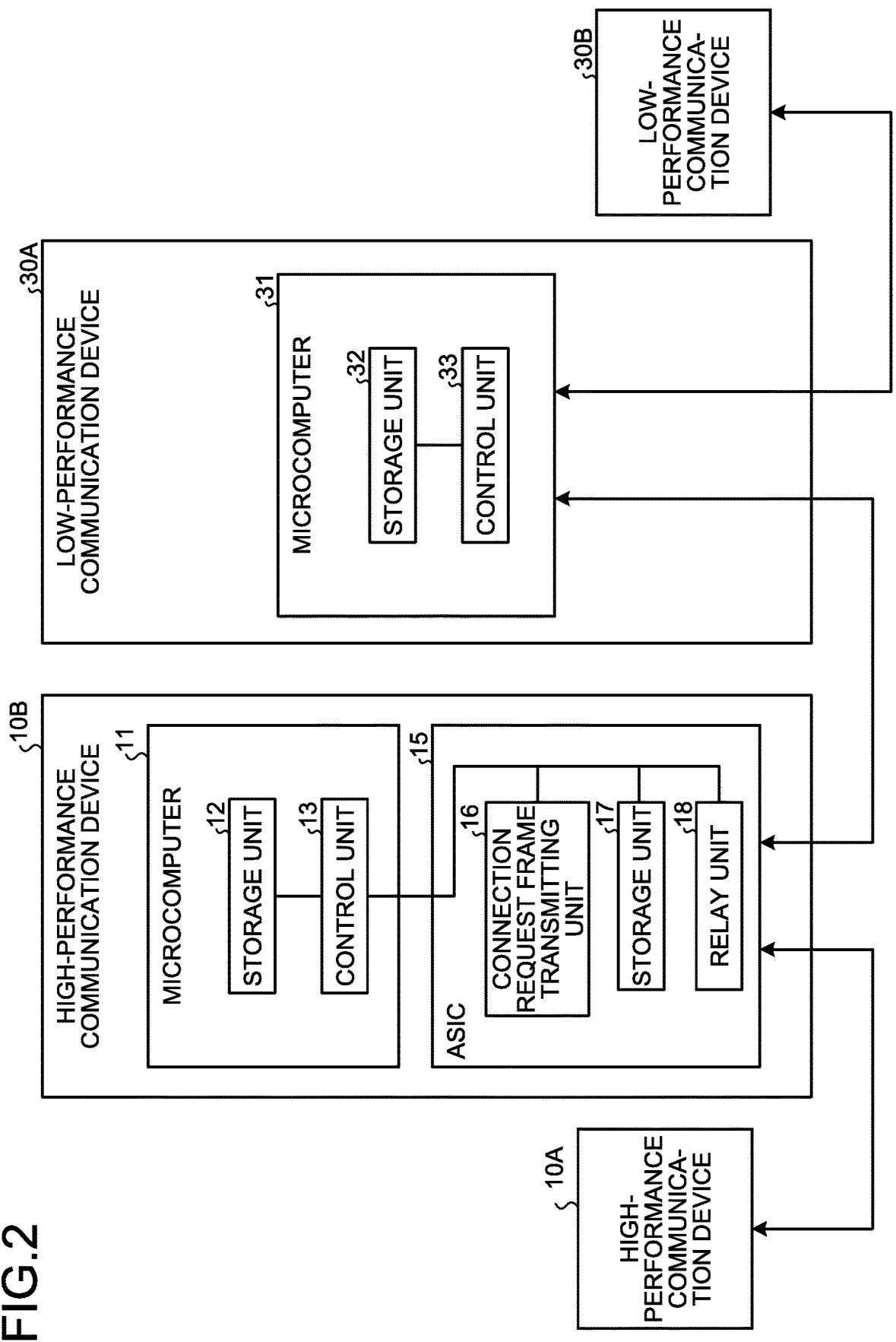
FIG. 2 is a diagram illustrating configurations of communication devices according to the first embodiment.

FIG. 2 is a diagram illustrating configurations of the communication devices according to the first embodiment. In FIG. 2, the configuration of the high-performance communication device 10B of the communication system 101X and the configuration of the low-performance communication device 30A of the communication system 101X are illustrated. Note that the high-performance communication device 10A and the master station 100 have configurations similar to that of the high-performance communication device 10B. Specifically, the master station 100, which is the high-performance communication device 10C, and the high-performance communication devices 10A and 10B have similar functions. The high-performance communication devices 10A to 10C perform different operations depending on the connection positions in the communication system 101X. In addition, the high-performance communication devices 10A to 10C perform different operations depending on whether the device is set as the master station 100. In addition, the low-performance communication device 30B has a configuration similar to that of the low-performance communication device 30A.

The high-performance communication device 10B includes a microcomputer 11, which is a first microcomputer that controls communication processing, and an ASIC 15, which is a control circuit that performs frame relay processing. The ASIC 15 is connected to the microcomputer 11. The microcomputer 11 and the ASIC 15 perform different operations depending on whether the device in which the microcomputer 11 and the ASIC 15 are included is the master station 100.

The ASIC 15 receives various frames from other communication devices and transmits various frames to other communication devices. The ASIC 15 includes a storage unit 17 that temporarily stores received frames, and a relay unit 18 that relays received frames to other communication devices. The ASIC 15 also includes a connection request frame transmitting unit 16 that transmits the connection request frame described above. The connection request frame transmitting unit 16 broadcasts the connection request frame in a case where the device in which the connection request frame transmitting unit 16 is included is the master station 100.

The relay unit 18 stores received frames in the storage unit 17. Upon receiving a frame destined to the device in which the relay unit 18 is included, the relay unit 18 sends the frame from the storage unit 17 to the microcomputer 11. In contrast, upon receiving a frame destined to another device, the relay unit 18 transmits the frame toward the device to which the frame is destined. The relay unit 18 also transmits various frames sent from the microcomputer 11 to destinations specified in the frames. Note that the microcomputer 11 may transmit a frame to another device without using the ASIC 15.

In addition, upon receiving an instruction to perform filtering from the microcomputer 11, the relay unit 18 performs filtering of a frame. The filtering is processing to switch between permitting and blocking of data communication on the basis of whether a specific condition is met. For performing the filtering, the relay unit 18 switches between relay of broadcast frames and discarding of broadcast frames. Specifically, upon receiving broadcast frames as a result of performing the filtering, the relay unit 18 relays the broadcast frames into the communication network 51X but does not relay the broadcast frames into the communication network 52X.

In the communication system 101X, upon receiving broadcast frames from the master station 100, the relay unit 18 of the high-performance communication device 10A relays the broadcast frames to the high-performance communication device 10B. Upon receiving broadcast frames from the high-performance communication device 10A, the relay unit 18 of the high-performance communication device 10B relays the broadcast frames to high-performance communication devices (not illustrated) other than the high-performance communication device 10A, but does not relay the broadcast frames to the low-performance communication device 30A. In this manner, the high-performance communication device 10B, which is a boundary station that relays broadcast frames, controls a band in the communication network 52X. As a result, the high-performance communication device 10B can avoid the situation where the band in the communication network 52X becomes insufficient.

The microcomputer 11 controls processing of communication with other communication devices. The microcomputer 11 herein controls processing of communication with the high-performance communication device 10A and the low-performance communication device 30A.

The microcomputer 11 includes a storage unit 12 that stores various data, and a control unit 13 that controls communication processing. The storage unit 12 includes a read only memory (ROM) that stores firmware and a random access memory (RAM) that stores temporary data. Examples of the temporary data stored in the RAM are data used for controlling communication processing and data on received frames.

In the case where the high-performance communication device 10C is the master station 100, the control unit 13 of the high-performance communication device 10C sets a boundary station on the basis of the filtering information transmitted from the slave stations. The control unit 13 of the high-performance communication device 10C then transmits the first relay setting frame to the set boundary station.

Upon receiving a connection request frame from the master station 100, the control units 13 of the high-performance communication devices 10A and 10B replace connection establishment information contained in the connection request frame with information on the high-performance communication devices 10A and 10B. Specifically, the control units 13 of the high-performance communication devices 10A and 10B replace a transmission port number of a relay source and a media access control (MAC) address of the relay source contained in the connection establishment information with information on the high-performance communication devices 10A and 10B. The control units 13 of the high-performance communication devices 10A and 10B then relay the connection request frame that contains the connection establishment information resulting from the replacement to a port other than the reception port. The reception port is a port that has received the connection request frame.

In the communication system 101X, upon receiving a connection request frame from the master station 100, the control unit 13 of the high-performance communication device 10A replaces the connection establishment information with information on the high-performance communication device 10A, and transmits the resulting connection request frame to the high-performance communication device 10B. In addition, upon receiving the connection request frame from the high-performance communication device 10A, the control unit 13 of the high-performance communication device 10B replaces the connection establishment information with information on the high-performance communication device 10B, and transmits the resulting connection request frame to the low-performance communication device 30A.

Furthermore, upon receiving a connection request frame from the master station 100, the control units 13 of the high-performance communication devices 10A and 10B transmit filtering information contained in the station-port information (described above) toward the master station 100 by using a request response frame mentioned above. In this process, the control units 13 of the high-performance communication devices 10A and 10B include filtering information indicating that broadcast frames can be relayed in the request response frame, and transmit the request response frame toward the master station 100.

In the communication system 101X, upon receiving a connection request frame, the control unit 13 of the high-performance communication device 10B transmits a request response frame to the high-performance communication device 10A. The high-performance communication device 10A transmits the request response frame to the master station 100. In addition, upon receiving a connection request frame, the control unit 13 of the high-performance communication device 10A transmits a request response frame to the master station 100.

Furthermore, upon receiving a first relay setting frame described above from the master station 100, the control unit 13 of the high-performance communication device 10B sets for each port whether relay of broadcast frames is permitted on the basis of the first relay setting frame. Upon setting whether relay of broadcast frames is permitted, the control unit 13 of the high-performance communication device 10B transmits a setting acknowledgement frame toward the master station 100.

In the communication system 101X, upon receiving a first relay setting frame from the master station 100, the control unit 13 of the high-performance communication device 10B transmits a setting acknowledgement frame described above to the high-performance communication device 10A. The high-performance communication device 10A transmits the setting acknowledgement frame to the master station 100.

The low-performance communication device 30A includes a microcomputer 31, which is a second microcomputer. The microcomputer 31 controls processing of communication with other communication devices. The microcomputer 31 herein controls processing of communication with the high-performance communication device 10B and the low-performance communication device 30B.

The microcomputer 31 includes a storage unit 32 that stores various data and a control unit 33 that controls communication processing. The storage unit 32 includes a ROM that stores firmware and a RAM that stores temporary data. Examples of the temporary data stored in the RAM are data used for controlling communication processing and data on received frames.

Furthermore, upon receiving a connection request frame from the master station 100, the control unit 33 transmits filtering information contained in the station-port information toward the master station 100 by using a request response frame. In this process, the control unit 33 includes filtering information indicating that broadcast frames cannot be relayed in the request response frame, and transmits the request response frame toward the master station 100.

Figure 3:
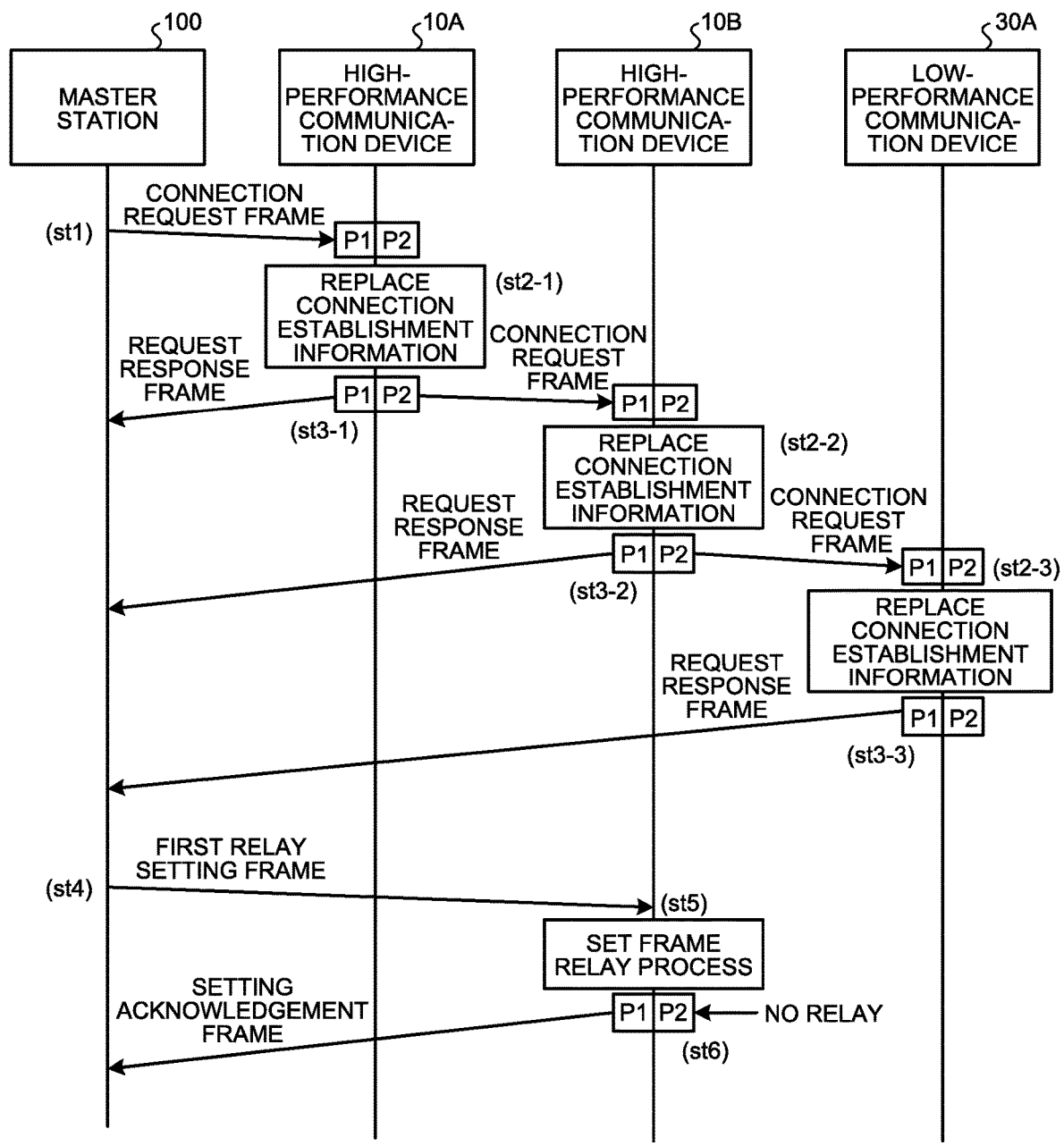
FIG. 3 is a sequence diagram for describing procedures of processing for a boundary station setting process according to the first embodiment.

Next, procedures of processing for setting a boundary station will be explained. FIG. 3 is a sequence diagram for describing procedures of processing for a boundary station setting process according to the first embodiment. Herein, procedures of processing in a case where the communication system 101X sets a boundary station will be explained.

In step st1, the connection request frame transmitting unit 16 of the master station 100 broadcasts a connection request frame requesting connection establishment information from the respective slave stations. The connection request frame is a broadcast frame. The connection request frame broadcasted by the control unit 13 of the master station 100 is transmitted to the high-performance communication device 10A.

The control unit 13 of the high-performance communication device 10A thus receives the connection request frame. In step st2-1, the control unit 13 of the high-performance communication device 10A then replaces connection establishment information contained in the connection request frame with information on the high-performance communication device 10A. The control unit 13 of the high-performance communication device 10A further relays the connection request frame that contains the connection establishment information resulting from the replacement to a port other than the reception port having received the connection request frame. In a case where the high-performance communication device 10A received the connection request frame at a port P1, the high-performance communication device 10A broadcasts the connection request frame through a port P2 that is a port different from the port P1.

The control unit 13 of the high-performance communication device 10B thus receives the connection request frame. In step st2-2, the control unit 13 of the high-performance communication device 10B then replaces connection establishment information contained in the connection request frame with information on the high-performance communication device 10B. The control unit 13 of the high-performance communication device 10B further relays the connection request frame that contains the connection establishment information resulting from the replacement to a port other than the reception port having received the connection request frame. In a case where the high-performance communication device 10B received the connection request frame at a port P1, the high-performance communication device 10B broadcasts the connection request frame through a port P2 that is a port different from the port P1.

The control unit 33 of the low-performance communication device 30A thus receives the connection request frame. In step st2-3, the control unit 33 of the low-performance communication device 30A then replaces connection establishment information contained in the connection request frame with information on the low-performance communication device 30A. In this case, the low-performance communication device 30A does not relay the connection request frame, which is a broadcast frame. In a case where the low-performance communication device 30A received the connection request frame at a port P1, the low-performance communication device 30A does not relay the connection request frame through any port such as a port P2.

In addition, after replacing the connection establishment information contained in the connection request frame with the information on the high-performance communication device 10A, the control unit 13 of the high-performance communication device 10A generates filtering information and includes the generated filtering information in a request response frame, and transmits the request response frame to the master station 100 through a port P1 in step st3-1. In this case, the control unit 13 of the high-performance communication device 10A includes filtering information indicating that broadcast frames can be relayed in the request response frame.

In addition, after replacing the connection establishment information contained in the connection request frame with the information on the high-performance communication device 10B, the control unit 13 of the high-performance communication device 10B generates filtering information and includes the generated filtering information in a request response frame, and transmits the request response frame to the master station 100 through a port P1 via the high-performance communication device 10A in step st3-2. In this case, the control unit 13 of the high-performance communication device 10B includes filtering information indicating that broadcast frames can be relayed in the request response frame.

In addition, after replacing the connection establishment information contained in the connection request frame with the information on the low-performance communication device 30A, the control unit 33 of the low-performance communication device 30A generates filtering information and includes the generated filtering information in a request response frame, and transmits the request response frame to the master station 100 through a port P1 via the high-performance communication devices 10A and 10B in step st3-3. In this case, the control unit 33 of the low-performance communication device 30A includes filtering information indicating that broadcast frames cannot be relayed in the request response frame.

The control unit 13 of the master station 100 receives the request response frame from each of the high-performance communication devices 10A and 10B and the low-performance communication device 30A, which are slave station. The control unit 13 of the master station 100 then sets a boundary station on the basis of the received filtering information. The control unit 13 of the master station 100 is aware of that the high-performance communication device 10B is connected to the low-performance communication device 30A. In addition, the filtering information from the low-performance communication device 30A indicates that broadcast frames cannot be relayed. In contrast, the filtering information from the high-performance communication device 10B indicates that broadcast frames can be relayed. The control unit 13 of the master station 100 thus sets the high-performance communication device 10B, which is a communication device connected to the low-performance communication device 30A, as a boundary station from among the high-performance communication devices 10A and 10B. In step st4, the control unit 13 of the master station 100 then transmits a first relay setting frame to the high-performance communication device 10B set as a boundary station.

The control unit 13 of the high-performance communication device 10B thus receives the first relay setting frame via the high-performance communication device 10A. Thus, in step st5, the control unit 13 of the high-performance communication device 10B transmits an instruction to perform filtering to the relay unit 18 of the high-performance communication device 10B. The relay unit 18 of the high-performance communication device 10B then sets the settings for a frame relay process. Specifically, the relay unit 18 of the high-performance communication device 10B sets a port connected to the communication network 51X to relay broadcast frames, and sets ports connected to the communication network 52X not to relay broadcast frames. In a case where a port connected to the communication network 51X is a port P1, the relay unit 18 of the high-performance communication device 10B sets the port P1 to relay broadcast frames, and sets a port P2, which is a port other than the port P1, not to relay broadcast frames.

Thus, upon receiving broadcast frames, the relay unit 18 of the high-performance communication device 10B relays the broadcast frames to communication devices in the communication network 51X such as the high-performance communication device 10A. In contrast, even when receiving broadcast frames, the relay unit 18 of the high-performance communication device 10B does not relay the broadcast frames to communication devices in the communication network 52X such as the low-performance communication device 30A.

After performing settings for the frame relay process, the control unit 13 of the high-performance communication device 10B transmits a setting acknowledgement frame toward the master station 100 through the port P1 in step st6. The control unit 13 of the master station 100 thus receives the setting acknowledgement frame via the high-performance communication device 10A.

Note that either of the processing of relaying the connection request frame to a port other than the reception port of the connection request frame and the processing of transmitting the request response frame to the master station 100 may be performed first by the control unit 13 of the high-performance communication device 10A.

In addition, either of the processing of relaying the connection request frame to a port other than the reception port of the connection request frame and the processing of transmitting the request response frame to the master station 100 may be performed first by the control unit 13 of the high-performance communication device 10B.

Figure 4:
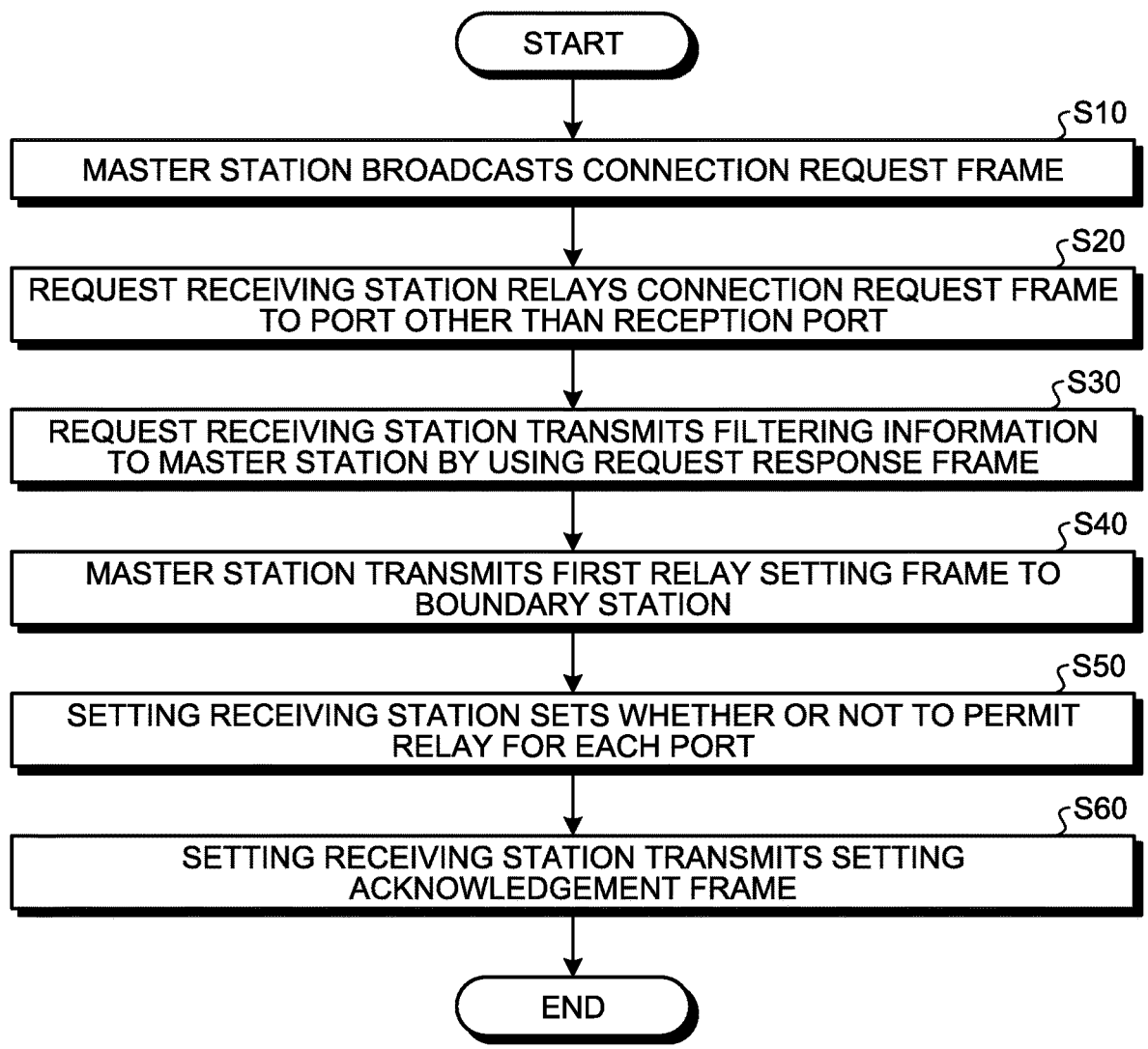
FIG. 4 is a flowchart illustrating procedures of processing for the boundary station setting process according to the first embodiment.

FIG. 4 is a flowchart illustrating procedures of processing for the boundary station setting process according to the first embodiment. Herein, procedures of processing in a case where the communication system 101X sets a boundary station will be explained.

In step S10, the master station 100 broadcasts a connection request frame to the respective slave stations. Each request receiving station thus receives the connection request frame, and the request receiving station relays the connection request frame to a port other than the reception port in step S20. A request receiving station is a communication device that receives the connection request frame. The request receiving stations herein are the high-performance communication devices 10A and 10B and the low-performance communication device 30A, and the reception port is a port at which the connection request frame was received. Note that the low-performance communication device 30A receives the connection request frame but does not relay the connection request frame.

In step S30, each request receiving station transmits filtering information to the master station 100 by using a request response frame. The high-performance communication devices 10A and 10B include filtering information indicating that broadcast frames can be relayed in the request response frame, and transmit the request response frame to the master station 100. In addition, the low-performance communication device 30A includes filtering information indicating that broadcast frames cannot be relayed in the request response frame, and transmits the request response frame to the master station 100.

The master station 100 receives the request response frames from the high-performance communication devices 10A and 10B and the low-performance communication device 30A. In step S40, the master station 100 then transmits a first relay setting frame to a boundary station. The boundary station herein is the high-performance communication device 10B.

A setting receiving station thus receives the first relay setting frame. The setting receiving station is a communication device that is the destination of the first relay setting frame. The setting receiving station herein is the high-performance communication device 10B. Thus, in step S50, the high-performance communication device 10B, which is the setting receiving station, sets for each port whether to permit relay on the basis of the first relay setting frame.

In step S60, the high-performance communication device 10B, which is the setting receiving station, then transmits a setting acknowledgement frame to the master station 100. Note that the request receiving station may first perform either of the processing in step S20 and the processing in step S30.

The control unit 13 of the high-performance communication device 10B sets for each port whether relay of broadcast frames is permitted by performing the processing explained with reference to FIGS. 3 and 4. In this manner, the relay unit 18 of the high-performance communication device 10B performs filtering of broadcast frames.

Figure 5:
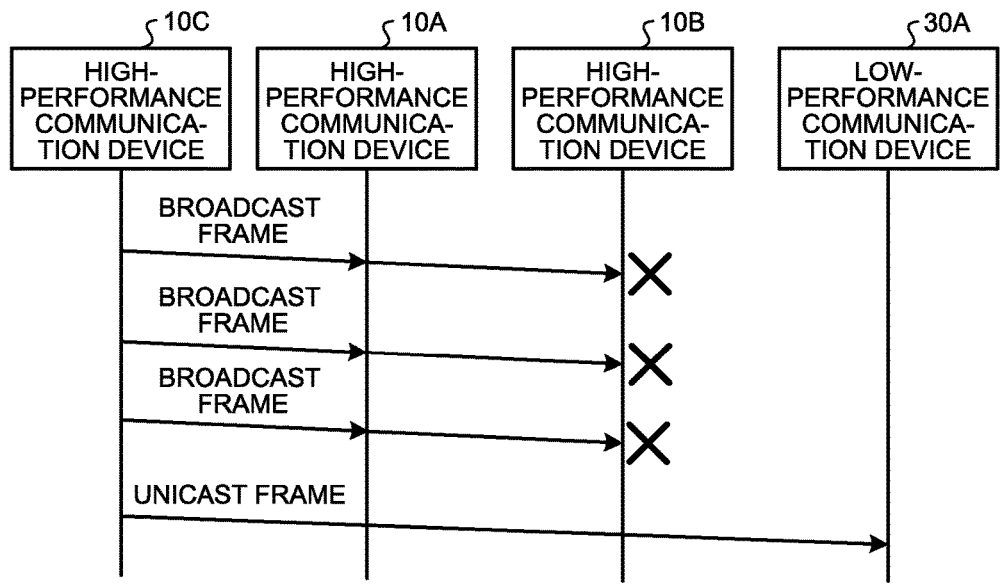
FIG. 5 is a diagram for describing a traffic adjusting process according to the first embodiment.

Here, a traffic adjusting process for adjusting the traffic of broadcast frames by using filtering will be explained. FIG. 5 is a diagram for describing the traffic adjusting process according to the first embodiment. FIG. 5 illustrates procedures of communication processing performed in the communication system 101X.

The high-performance communication device 10C, which is the master station 100, transmits broadcast frames through all the ports. The high-performance communication device 10A thus receives the broadcast frames, and relays the broadcast frames through ports other than the reception port. The high-performance communication device 10B thus receives the broadcast frames. The high-performance communication device 10B herein sets whether relay of broadcast frames is permitted. Thus, the relay unit 18 of the high-performance communication device 10B relays the broadcast frames to the other high-performance communication devices in the communication network 51X, but does not relay the broadcast frames to the low-performance communication device 30A.

In this manner, the high-performance communication device 10B, which is a boundary station, filters out the broadcast frames to be transmitted to the low-performance communication device 30A. This is because, when continuous broadcast frames are transmitted, the low-performance communication device 30A, which has a low specification, may not be able to process all the broadcast frames and may result in packet drop. In a case where there is data that needs to be transmitted to the low-performance communication device 30A, the high-performance communication device 10C, which is the master station 100, unicasts the data to the low-performance communication device 30A using unicast frames. The frames of data that the high-performance communication device 10C unicasts to the low-performance communication device 30A are unicast frames. The unicast transmission is processing of specifying a single address in a network and transmitting data to a single device. The unicast transmission performed by the high-performance communication device 10C herein is processing of specifying the address of the low-performance communication device 30A, which is the single address, in the communication system 101X and transmitting data to the low-performance communication device 30A, which is the single device. The unicast transmission is performed so that the high-performance communication device 10C transmits specific data to the low-performance communication device 30A.

Note that a communication system using hubs may perform filtering of broadcast frames. Specifically, a communication system that includes hubs may be used instead of the communication system 101X.

Figure 6:
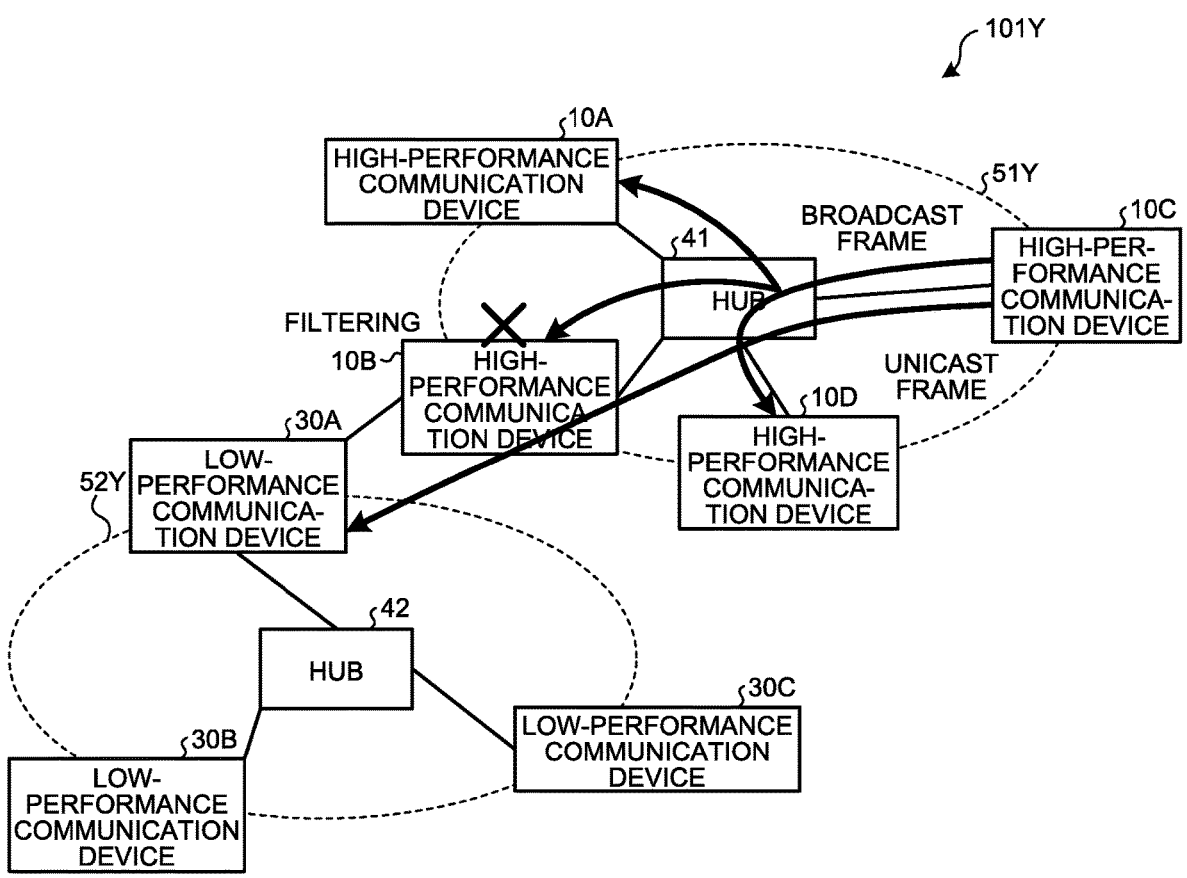
FIG. 6 is a diagram for describing a traffic adjusting process performed by a communication system that includes hubs according to the first embodiment.

Here, an example configuration of another communication system that is the communication system that includes hubs and a traffic adjusting process for adjusting the traffic of frames performed by this communication system will be described. FIG. 6 is a diagram for describing the traffic adjusting process performed by the communication system that includes the hubs according to the first embodiment. FIG. 6 illustrates a configuration of a communication system 101Y, which is another example configuration of the communication system 101X. The communication system 101Y includes a communication network 51Y, which is the first communication network, instead of the communication network 51X and also includes a communication network 52Y, which is the second communication network, instead of the communication network 52X.

The communication network 51Y includes high-performance communication devices 10A to 10D and a hub 41. In the communication network 51Y, the high-performance communication devices 10A to 10D are connected to one another via the hub 41. The high-performance communication device 10D is a communication device having functions similar to those of the high-performance communication devices 10A to 10C.

In the meantime, the communication network 52Y includes low-performance communication devices 30A to 30C and a hub 42. In the communication network 52Y, the low-performance communication devices 30A to 30C are connected to one another via the hub 42. The low-performance communication device 30C is a communication device having similar functions to those of the low-performance communication devices 30A and 30B.

In addition, the high-performance communication device 10B and the low-performance communication device 30A are connected to each other. In such a configuration, the high-performance communication device 10B is a boundary station. The high-performance communication device 10B thus sets port settings such that broadcast frames are not relayed to the low-performance communication device 30A.

When the high-performance communication device 10C, which is the master station 100, transmits broadcast frames, the hub 41 receives the broadcast frames from the high-performance communication device 10C. The hub 41 then relays the received broadcast frames to ports other than the reception port. The broadcast frames are thus relayed to the high-performance communication devices 10A, 10B, and 10D, and the high-performance communication devices 10A, 10B, and 10D receive the broadcast frames. In this case, the high-performance communication device 10B, which is a boundary station, does not relay the received broadcast frames to the low-performance communication device 30A.

In a case where there is data that needs to be transmitted to the low-performance communication device 30A, the high-performance communication device 10C, which is the master station 100, transmits the data to the low-performance communication device 30A by using unicast frames. In this case, the high-performance communication device 10C transmits the unicast frames addressed to the low-performance communication device 30A to the hub 41, and the hub 41 relays the unicast frames to ports other than the reception port. As a result, the unicast frames are relayed to the high-performance communication device 10B. The high-performance communication device 10B then relays the unicast frames to the low-performance communication device 30A.

Note that, in the communication system 101Y, the high-performance communication devices 10A to 10D transmit and receive connection request frames, request response frames, first relay setting frames, and setting acknowledgement frames via the hub 41.

In addition, the communication network 51Y may have any configuration of connections as long as the communication network 51Y includes the high-performance communication devices 10A to 10D and the hub 41. In addition, the communication network 52Y may have any configuration of connections as long as the communication network 52Y includes a plurality of low-performance communication devices 30A to 30C and the hub 42. The number of high-performance communication devices of the communication network 51Y may be five or larger or three or smaller. The number of low-performance communication devices of the communication network 52Y may be four or larger or two or smaller.

Next, a hardware configuration of the microcomputers 11 of the high-performance communication devices 10A to 10D will be described. Since the microcomputers 11 of the high-performance communication devices 10A to 10D have configurations similar to each other, a hardware configuration of the microcomputer 11 of the high-performance communication device 10A will be described herein.

Figure 7:
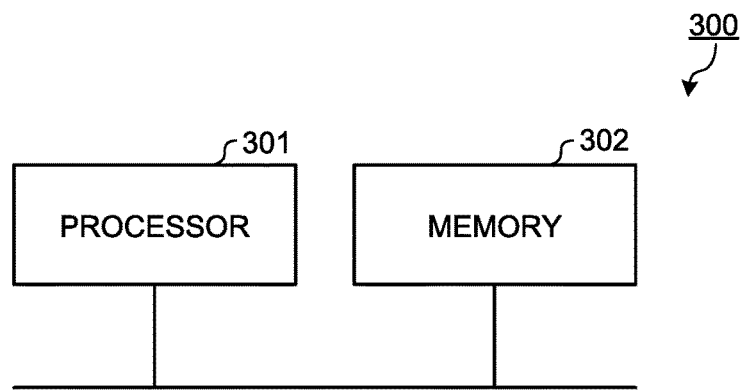
FIG. 7 is a diagram illustrating an example hardware configuration of a microcomputer according to the first embodiment.

FIG. 7 is a diagram illustrating an example hardware configuration of a microcomputer according to the first embodiment. The microcomputer 11 may be implemented by a control circuit 300 illustrated in FIG. 7, that is, by a processor 301 and a memory 302. Examples of the processor 301 include a central processing unit (CPU; also referred to as a central processing device, a processing device, a computing device, a microprocessor, or a digital signal processor (DSP)), and a system large scale integration (LSI). Examples of the memory 302 include a RAM and a ROM.

The microcomputer 11 is implemented by the processor 301 reading and executing programs for performing operations of the microcomputer 11 stored in the memory 302. In other words, the programs cause a computer to execute the procedures or methods of the microcomputer 11. The programs to be executed by the processor 301 may be software or firmware. The memory 302 is also used as a temporary memory when the processor 301 executes various processes.

Thus, the programs to be executed by the processor 301 are a computer program product including a non-transitory computer-readable recording medium containing a plurality of computer-executable instructions for performing data processing. The programs to be executed by the processor 301 include a plurality of instructions that cause a computer to perform data processing.

Some of the functions of the microcomputer 11 may be implemented by dedicated hardware, and others may be implemented by software or firmware. Note that the microcomputers 31 of the low-performance communication devices 30A to 30C also have hardware configurations similar to that of the microcomputer 11.

As described above, in the first embodiment, since the high-performance communication device 10B restricts relay of broadcast frames to the low-performance communication device 30A, no broadcast frames are relayed into the communication networks 52X and 52Y in which the low-performance communication device 30A is located. If the high-performance communication device 10B relays broadcast frames to the low-performance communication device 30A, the broadcast frames are also relayed into the communication networks 52X and 52Y in which the low-performance communication device 30A is located. In this case, since the low-performance communication devices 30A to 30C only have communication processing performance lower than that of the high-performance communication devices 10A to 10D, the band in the communication networks 52X and 52Y is likely to become insufficient, and packet drop is likely to occur in the low-performance communication devices 30A to 30C. Thus, in a case where the high-performance communication device 10B does not restrict relay of broadcast frames to the low-performance communication device 30A, the master station 100 cannot transmit broadcast frames.

As described above, according to the first embodiment, in the communication systems 101X and 101Y in which communication devices having different communication processing performances are present, the high-performance communication device 10B, which is a boundary station, restricts relay of broadcast frames to the low-performance communication device 30A. In other words, the boundary station filters out broadcast frames to be transmitted from the communication network 51X or 51Y to the communication network 52X or 52Y. As a result, broadcast frames are not relayed to the low-performance communication devices 30A to 30C. This allows the high-performance communication device 10B to adjust the data traffic from the communication network 51X or 51Y to the communication network 52X or 52Y, which allows the high-performance communication device 10B to avoid the situation where the band in the communication networks 52X and 52Y becomes insufficient. Therefore, the communication systems 101X and 101Y can each efficiently perform stable communication even though the communication system includes communication devices having different communication processing performances.

Second Embodiment

Next, a second embodiment of the invention will be described with reference to FIGS. 8 and 9. In the second embodiment, in the communication system 101X, multicast frames are transmitted and received between the low-performance communication devices 30A to 30C, and the high-performance communication device 10B, which is a boundary station, filters out multicast frames transmitted from the low-performance communication devices 30A to 30C so as not to relay the multicast frames to the high-performance communication devices 10A and 10C. Frames of data that each of the low-performance communication devices 30A to 30C multicasts to the others of the low-performance communication devices 30A to 30C are multicast frames. The multicast transmission is processing of transmitting the same data simultaneously to a plurality of specified devices in a network. Thus, the multicast transmission performed by each of the low-performance communication devices 30A to 30C is processing of specifying addresses of the low-performance communication devices 30A to 30C other than itself in the communication system 101X and transmitting data to the specified low-performance communication devices. Each of the low-performance communication devices 30A to 30C, by multicasting to the others of the low-performance communication devices 30A to 30C, transmits the same data simultaneously to the others of the low-performance communication devices 30A to 30C. For example, in a case where the low-performance communication device 30A performs multicast transmission, the low-performance communication device 30A specifies the addresses of the low-performance communication devices 30B and 30C and transmits the same data simultaneously to the low-performance communication devices 30B and 30C.

In the second embodiment, the communication system 101X sets a boundary station by performing processing procedures similar to those in the boundary station setting process described with reference to FIG. 3 in the first embodiment. In this case, the control unit 13 of the master station 100 sets the high-performance communication device 10B as a boundary station on the basis of the filtering information received from the slave stations. The control unit 13 of the master station 100 then transmits a second relay setting frame to the high-performance communication device 10B set as a boundary station.

The second relay setting frame in the second embodiment is a frame specifying for each port whether to relay multicast frames. In other words, the second relay setting frame is a frame instructing a boundary station to restrict relay of multicast frames. An example of the second relay setting frame is Relay Configuration frame. The second relay setting frame transmitted by the master station 100 specifies a port at which filtering of multicast frames is to be performed. Specifically, the second relay setting frame specifies that multicast frames transmitted from the low-performance communication device 30A are not to be relayed through ports connected to the other high-performance communication devices such as the high-performance communication device 10A.

Figure 8:
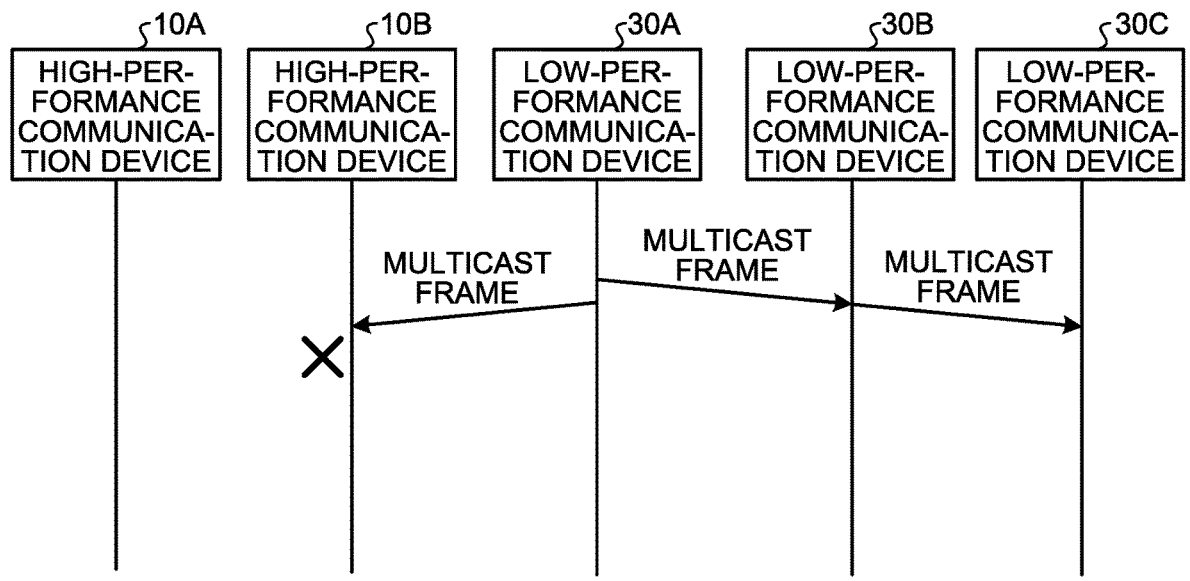
FIG. 8 is a diagram for describing a traffic adjusting process according to a second embodiment.

FIG. 8 is a diagram for describing the traffic adjusting process according to the second embodiment. FIG. 8 illustrates procedures of communication processing in the communication system 101X. The low-performance communication devices 30A to 30C in the communication network 52X transmit and receive data by using multicast frames. When the low-performance communication device 30A transmits multicast frames to the low-performance communication device 30B, the multicast frames are received by the low-performance communication device 30B. When the low-performance communication device 30A transmits multicast frames to the low-performance communication device 30C, the low-performance communication device 30B relays the multicast frames to the low-performance communication device 30C. When the low-performance communication device 30A transmits multicast frames to the communication network 51X, the high-performance communication device 10B receives the multicast frames.

The high-performance communication device 10B herein sets whether relay of multicast frames is permitted. Thus, the relay unit 18 of the high-performance communication device 10B does not relay the multicast frames to the other communication device that is the high-performance communication device 10A in the communication network 51X.

In this manner, the high-performance communication device 10B, which is a boundary station, filters out the multicast frames transmitted from the low-performance communication device 30A. In other words, high-performance communication device 10B filters out multicast frames to be transmitted from the communication network 52X to the communication network 51X. This allows the low-performance communication devices 30A to 30C in the communication network 52X to transmit and receive multicast frames.

Note that the communication system 101Y that uses the hubs 41 and 42 similar to that in the first embodiment may perform filtering of multicast frames. Specifically, the communication system 101Y may be used instead of the communication system 101X.

Figure 9:
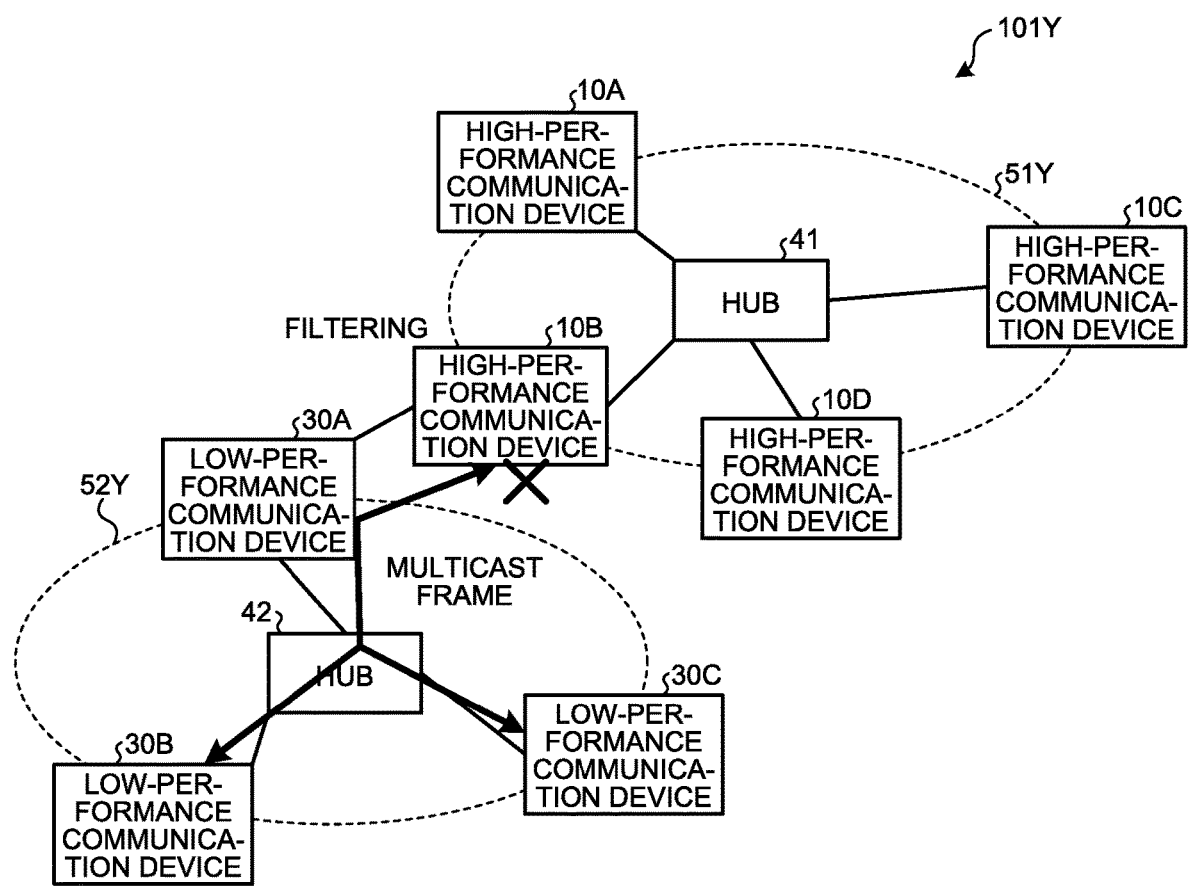
FIG. 9 is a diagram for describing a traffic adjusting process performed by a communication system that includes hubs according to the second embodiment.

FIG. 9 is a diagram for describing the traffic adjusting process performed by the communication system that includes the hubs according to the second embodiment. In the communication system 101Y, the high-performance communication device 10B is a boundary station. The high-performance communication device 10B thus sets port setting such that multicast frames are not relayed to the hub 41. In other words, the high-performance communication device 10B sets port settings such that multicast frames transmitted from the communication network 52Y are not relayed into the communication network 51Y.

When the low-performance communication device 30A transmits multicast frames, the multicast frames are sent to the hub 42 in the communication network 52Y. The hub 42 thus receives the multicast frames and relays the multicast frames to ports other than the reception port.

When low-performance communication device 30A transmits multicast frames to the high-performance communication device 10B, the high-performance communication device 10B receives the multicast frames. In this case, the high-performance communication device 10B, which is a boundary station, does not relay the received multicast frames into the communication network 51Y.

As described above, according to the second embodiment, in the communication systems 101X and 101Y in which communication devices having different communication processing performance are present, the high-performance communication device 10B, which is a boundary station, restricts the data traffic of multicast frames to the communication networks 51X and 51Y. Specifically, the high-performance communication device 10B filters out multicast frames to be transmitted from the communication network 52X or 52Y to the communication network 51X or 51Y. As a result, multicast frames from the communication network 52X or 52Y are not relayed to the high-performance communication devices 10A to 10D. This enables efficient communication between the low-performance communication devices 30A to 30C by using multicast frames.

Third Embodiment

Next, a third embodiment of the invention will be described with reference to FIGS. 10 and 11. In the third embodiment, in the communication system 101X, the high-performance communication device 10B, which is a boundary station, relays broadcast frames from the master station 100 to the low-performance communication device 30A once every two or more times broadcast frames are received. Note that the high-performance communication device 10B, which is a boundary station, may relay multicast frames from the master station 100 to the low-performance communication device 30A once every two or more times multicast frames are received. The communication system 101X operates similarly in the case where the frames that the boundary station relays to the low-performance communication device 30A once every two or more times frames are received are broadcast frames and in the case where such frames are multicast frames. The case where the frames that the boundary station relays to the low-performance communication device 30A once every two or more times frames are received are broadcast frames will therefore be described below.

In the third embodiment, the communication system 101X sets a boundary station by performing processing procedures similar to those in the boundary station setting process described with reference to FIG. 3 in the first embodiment. The control unit 13 of the master station 100 sets the high-performance communication device 10B as a boundary station on the basis of the filtering information received from the slave stations. The control unit 13 of the master station 100 then transmits a third relay setting frame to the high-performance communication device 10B set as a boundary station.

The third relay setting frame in the third embodiment is a frame specifying, for each port, how many times broadcast frames are received for every one time broadcast frames are relayed to the low-performance communication device 30A. In other words, the third relay setting frame is a frame instructing a boundary station to restrict relay of broadcast frames. An example of the third relay setting frame is Relay Configuration frame. The third relay setting frame transmitted by the master station 100 specifies which port restricts relay of broadcast frames and how many times broadcast frames are received for every one time broadcast frames are restricted. Specifically, the third relay setting frame specifies how many times broadcast frames are received for every one time broadcast frames are relayed to the low-performance communication device 30A.

Figure 10:
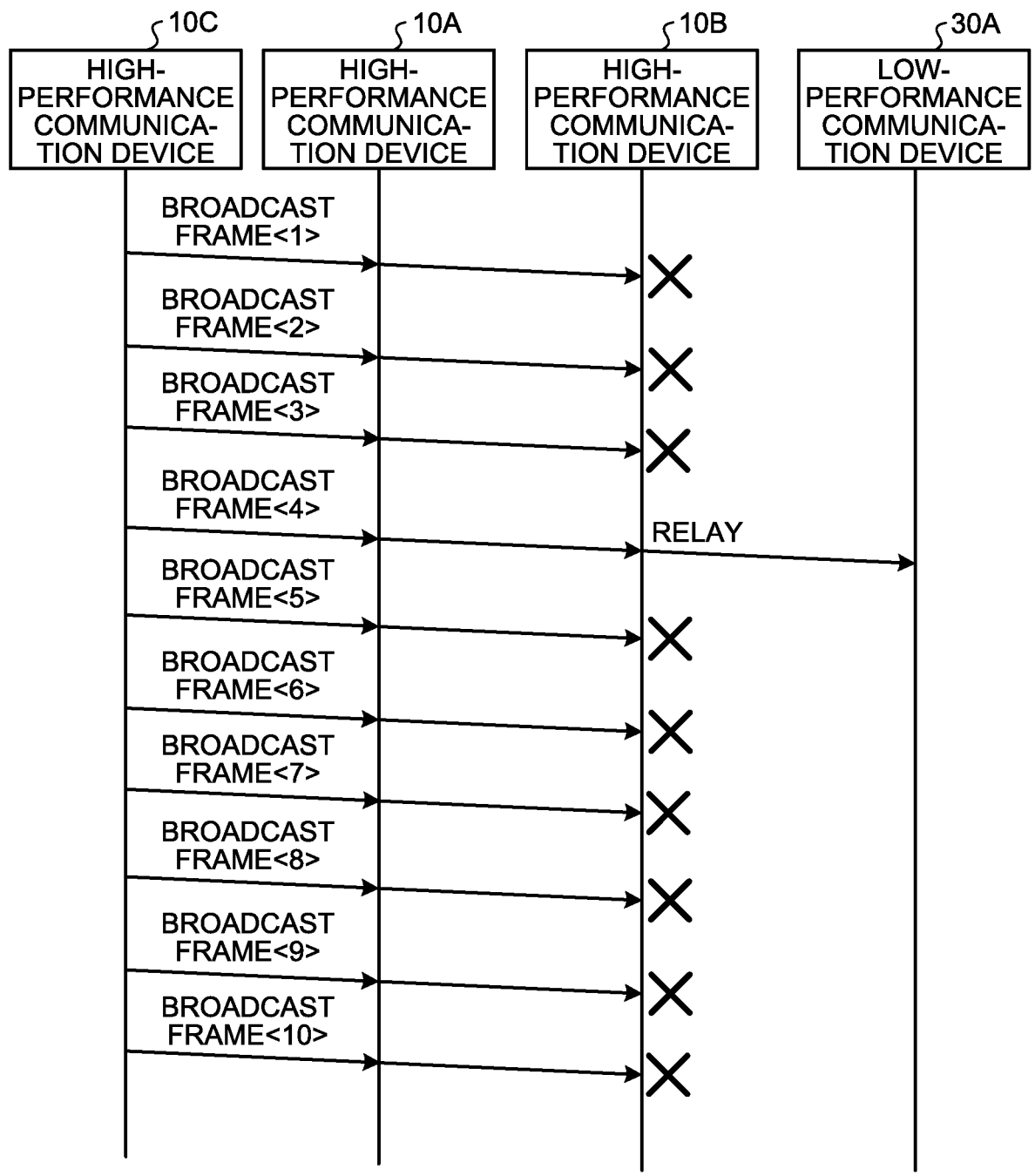
FIG. 10 is a diagram for describing a traffic adjusting process according to a third embodiment.

FIG. 10 is a diagram for describing the traffic adjusting process according to the third embodiment. FIG. 10 illustrates procedures of communication processing in the communication system 101X. The high-performance communication device 10C, which is the master station 100, transmits broadcast frames through all the ports. The high-performance communication device 10A thus receives the broadcast frames and relays the broadcast frames through ports other than the reception port. The high-performance communication device 10B thus receives the broadcast frames. The high-performance communication device 10B herein sets whether relay of broadcast frames is permitted. Thus, the relay unit 18 of the high-performance communication device 10B relays the broadcast frames to the other high-performance communication devices in the communication network 51X. In addition, the relay unit 18 of the high-performance communication device 10B relays broadcast frames to the low-performance communication device 30A once every specific number of times broadcast frames are received. FIG. 10 illustrates a case where the relay unit 18 of the high-performance communication device 10B relays broadcast frames to the low-performance communication device 30A once every ten times broadcast frames are received.

In this manner, the high-performance communication device 10B, which is a boundary station, limits the number of times broadcast frames are relayed to the low-performance communication device 30A. In other words, the high-performance communication device 10B adjusts the number of times broadcast frames are relayed from the communication network 51X to the communication network 52X. This allows the high-performance communication device 10B to avoid the situation where the band in the communication network 52X becomes insufficient.

Note that the communication system 101Y that uses the hubs 41 and 42 may perform filtering of broadcast frames. Specifically, the communication system 101Y that includes the hubs 41 and 42 may be used instead of the communication system 101X.

Figure 11:
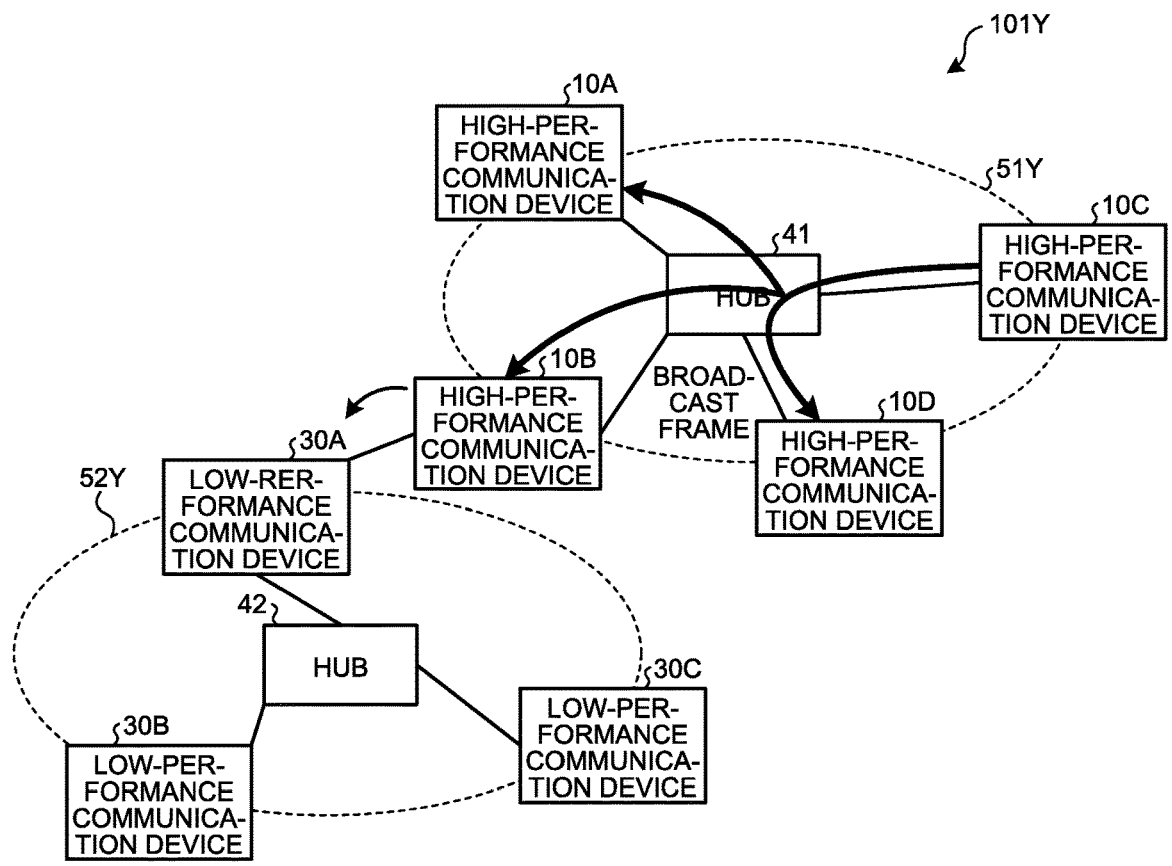
FIG. 11 is a diagram for describing a traffic adjusting process performed by a communication system that includes hubs according to the third embodiment.

FIG. 11 is a diagram for describing the traffic adjusting process performed by the communication system that includes the hubs according to the third embodiment. In the communication system 101Y, the high-performance communication device 10B is a boundary station. The high-performance communication device 10B thus performs port setting to limit the number of times broadcast frames are relayed to the low-performance communication device 30A. In other words, the high-performance communication device 10B performs port setting to limit the number of times broadcast frames are relayed from the communication network 51Y to the communication network 52Y.

When the high-performance communication device 10C, which is the master station 100, transmits broadcast frames, the hub 41 receives the broadcast frames from the high-performance communication device 10C. The hub 41 then relays the received broadcast frames to ports other than the reception port. The broadcast frames are thus relayed to the high-performance communication devices 10A, 10B, and 10D, and the high-performance communication devices 10A, 10B, and 10D receive the broadcast frames. In this case, the high-performance communication device 10B, which is a boundary station, relays the received broadcast frames to the low-performance communication device 30A once every specific number of times broadcast frames are received and does not relay the other broadcast frames to the low-performance communication device 30A.

As described above, according to the third embodiment, in the communication systems 101X and 101Y in which communication devices having different communication processing performances are present, the high-performance communication device 10B, which is a boundary station, limits relay of broadcast frames or multicast frames to the low-performance communication device 30A. Specifically, the high-performance communication device 10B, which is a boundary station, limits the number of times broadcast frames or multicast frames are relayed from the communication networks 51X or 51Y to the communication network 52X or 52Y. This allows the high-performance communication device 10B to adjust the data traffic from the communication network 51X or 51Y to the communication network 52X or 52Y, which allows the high-performance communication device 10B to avoid the situation where the band in the communication networks 52X and 52Y becomes insufficient. The communication system 101X is thus capable of efficiently performing stable communication even though the communication system 101X includes the high-performance communication devices 10A to 10D and the low-performance communication devices 30A to 30C having different communication processing performances.

Fourth Embodiment

Figure 12:
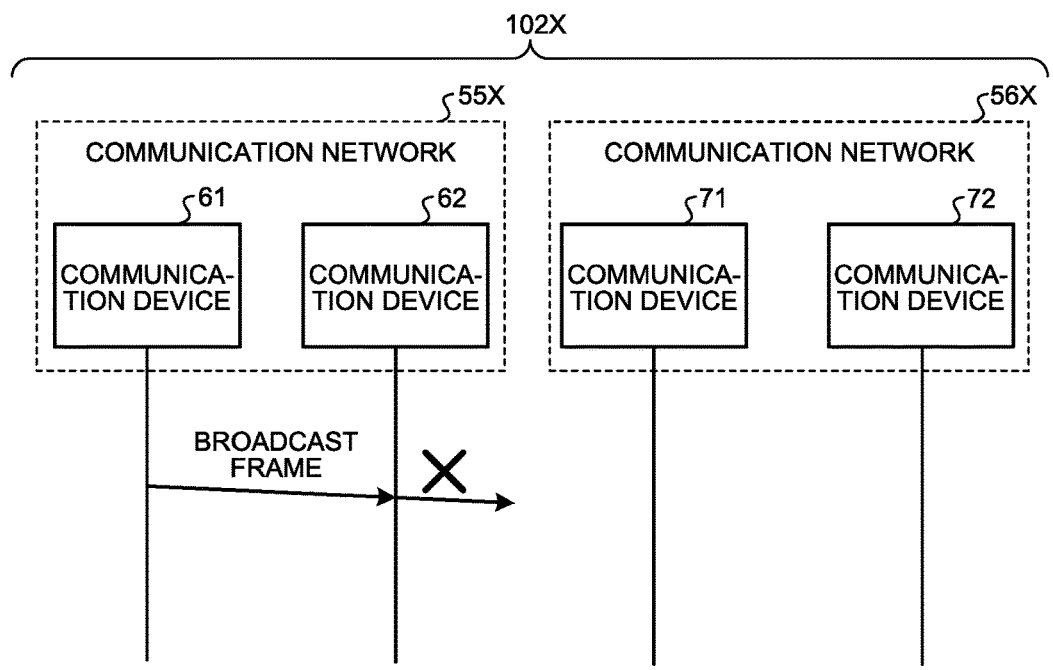
FIG. 12 is a diagram for describing a traffic adjusting process according to a fourth embodiment.

Next, a fourth embodiment of the invention will be described with reference to FIGS. 12 and 13. In the fourth embodiment, in a case where communication systems using different communication protocols are present, a boundary station performs filtering of frames between the communication systems. While a case where an example of frames filtered between the communication systems by the boundary station is broadcast frames will be explained in the description below, frames that are prohibited from being relayed may be other frames such as multicast frames.

In the fourth embodiment, data is transmitted and received between a plurality of communication systems. Each of the communication systems includes a plurality of communication devices. FIG. 12 is a diagram for describing a traffic adjusting process according to the fourth embodiment. FIG. 12 illustrates procedures of communication processing in a communication system 102X according to the fourth embodiment. The communication system 102X includes a communication network 55X, which is a first communication network, and a communication network 56X, which is a second communication network.

The communication network 55X and the communication network 56X are communication networks in which data communication is performed using different communication protocols from each other. Specifically, data communication is performed using a first communication protocol in the communication network 55X, and data communication is performed using a second communication protocol in the communication network 56X.

Examples of the communication network 55X are the communication systems 101X and 101Y and the communication networks 51X, 52X, 51Y, and 52Y. Examples of the communication network 56X are the communication systems 101X and 101Y and the communication networks 51X, 52X, 51Y, and 52Y.

Herein, a case where the communication network 55X includes communication devices 61 and 62, which are first communication devices and the communication network 56X includes communication devices 71 and 72, which are second communication devices, will be described. The communication device 61 and the communication device 62 have functions similar to each other, and the communication device 71 and the communication device 72 have functions similar to each other. The communication devices 61 and 62 may be the high-performance communication devices 10A to 10D or may be the low-performance communication devices 30A to 30C. In addition, the communication devices 71 and 72 may be the high-performance communication devices 10A to 10D or may be the low-performance communication devices 30A to 30C.

The communication device 61 and the communication device 62 are connected to each other in the communication network 55X, and the communication device 71 and the communication device 72 are connected to each other in the communication network 56X. In addition, the communication device 62 and the communication device 71 are connected to each other in the communication system 102X. Thus, in the communication system 102X, the communication device 62 or the communication device 71 is a boundary station. In the communication network 55X, either of the communication devices 61 and 62 is the master station 100, and in the communication network 56X, either of the communication devices 71 and 72 is the master station 100. Note that the communication network 55X may include three or more communication devices. In addition, the communication network 56X may include three or more communication devices.

In the fourth embodiment, a case where the communication device 61 is the master station 100 and the communication device 62 is a boundary station in the communication network 55X will be described. In the case where the communication device 61 is the master station 100, the communication device 62 is a slave station.

Note that description of the processing performed by the communication network 56X will be omitted below, but the communication network 56X is capable of performing processing similar to that performed by the communication network 55X.

The communication network 55X sets a boundary station by performing processing procedures similar to those in the boundary station setting process described with reference to FIG. 3 in the first embodiment. The control unit 13 of the master station 100 sets the communication device 62 as a boundary station on the basis of the filtering information received from the slave stations. The control unit 13 of the master station 100 then transmits a fourth relay setting frame to the communication device 62 set as a boundary station.

The fourth relay setting frame in the fourth embodiment includes information specifying frames that cannot be received by the communication network 56X among frames in the communication network 55X. An example of the fourth relay setting frame is Relay Configuration frame. The fourth relay setting frame transmitted by the master station 100 specifies which broadcast frame is filtered at which port. Specifically, the fourth relay setting frame specifies that specific types of broadcast frames are not to be relayed to the communication network 56X. As described above, the fourth relay setting frame is a frame instructing a boundary station to restrict broadcast frames.

After the boundary station is set, the communication device 61, which is the master station 100, transmits broadcast frames through all ports. The communication device 62, which is the boundary station, thus receives the broadcast frames and relays the broadcast frames through ports other than the reception port.

The communication device 62 herein sets whether relay of broadcast frames is permitted. Thus, the communication device 62 transmits the broadcast frames to the other communication devices in the communication network 55X through the ports other than the reception port. In addition, the communication device 62 relays specific types of broadcast frames to the communication device 71 in the communication network 56X, but does not relay the other types of broadcast frames to the communication device 71. Specifically, the communication device 62 does not relay, to the communication device 71, broadcast frames of the types that are prohibited from being relayed to the communication network 56X and relays, to the communication device 71, broadcast frames of the types that are not prohibited from being relayed to the communication network 56X.

In this manner, the communication device 62, which is a boundary station, limits the types of broadcast frames to be relayed to the communication device 71 in the communication network 56X. In other words, the communication device 62 selects the types of broadcast frames to be relayed from the communication network 55X to the communication network 56X. This allows the communication device 62 to avoid the situation where the band in the communication network 56X becomes insufficient.

Note that a communication system that uses hubs may perform filtering of broadcast frames. Specifically, a communication system that includes hubs may be used instead of the communication system 102X.

Figure 13:
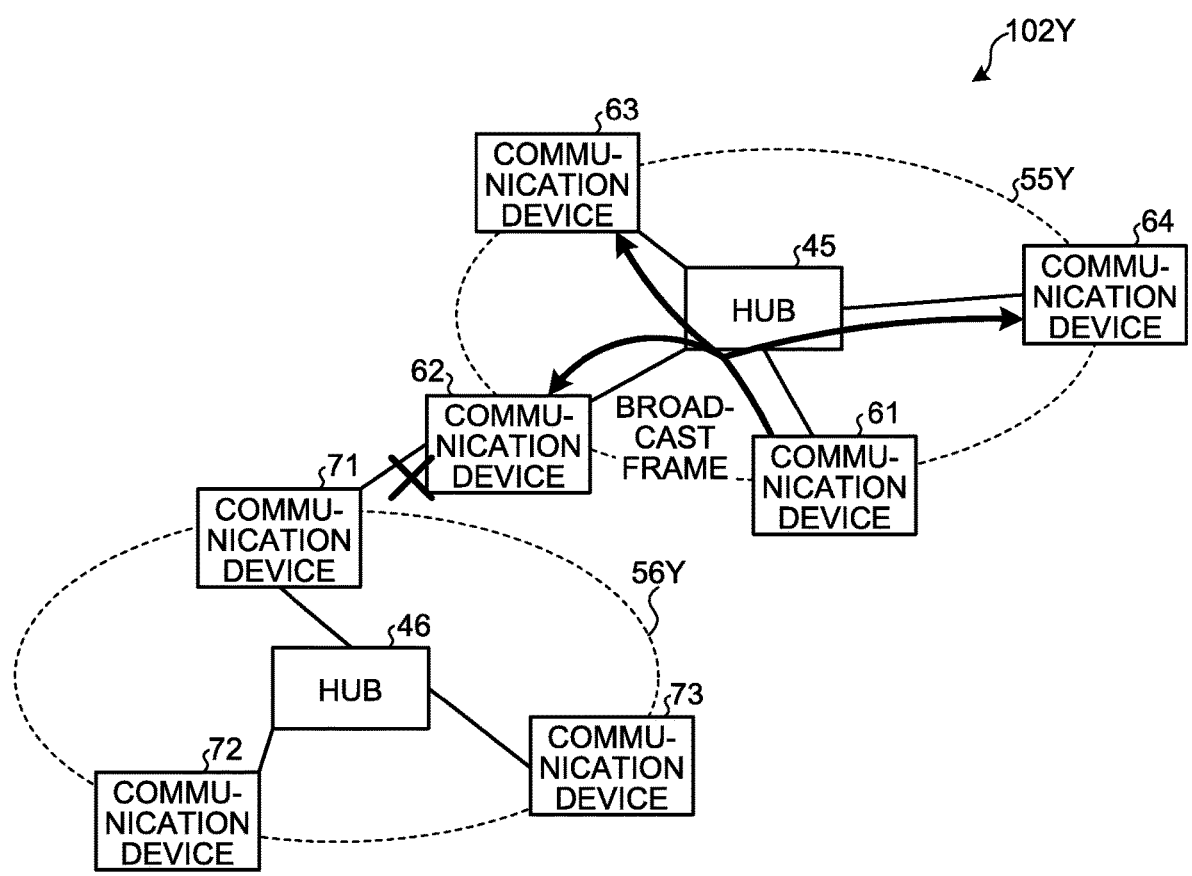
FIG. 13 is a diagram for describing a traffic adjusting process performed by a communication system that includes hubs according to the fourth embodiment.

FIG. 13 is a diagram for describing the traffic adjusting process performed by the communication system that includes the hubs according to the fourth embodiment. FIG. 13 illustrates a configuration of a communication system 102Y, which is another example configuration of the communication system 102X. The communication system 102Y includes a communication network 55Y instead of the communication network 55X and also includes a communication network 56Y instead of the communication network 56X.

The communication network 55Y includes communication devices 61 to 64 and a hub 45. In the communication network 55Y, the communication devices 61 to 64 are connected to one another via the hub 45. The communication devices 63 and 64 have functions similar to those of the communication devices 61 and 62.

In addition, the communication network 56Y includes communication devices 71 to 73 and a hub 46. In the communication network 56Y, the communication devices 71 to 73 are connected to one another via the hub 46. The communication device 73 has functions similar to those of the communication devices 71 and 72.

In addition, the communication device 62 and the communication device 71 are connected to each other. In such a configuration of the communication network 55Y, the communication device 62 is a boundary station. The communication device 62 thus performs port setting not to relay broadcast frames of the types that are prohibited from being relayed to the communication device 71.

When the communication device 61, which is the master station 100, transmits a specific type of broadcast frames, the hub 45 receives the broadcast frames from the communication device 61. The hub 45 then relays the received broadcast frames to ports other than the reception port. As a result, the broadcast frames are relayed to the communication devices 62 to 64, and the communication devices 62 to 64 receive the broadcast frames. In this case, the communication device 62, which is a boundary station, does not relay the received broadcast frames to the communication device 71.

Note that, in the communication system 102Y, the communication devices 61 to 64 transmit and receive connection request frames, request response frames, fourth relay setting frames, and setting acknowledgement frames via the hub 45.

In addition, the communication network 55Y may have any configuration of connections as long as the communication network 55Y includes the communication devices 61 to 64 and the hub 45. In addition, the communication network 56Y may have any configuration of connections as long as the communication network 56Y includes a plurality of communication devices 71 to 73 and the hub 46. The number of communication devices of the communication network 55Y may be five or larger or three or smaller. The number of communication devices of the communication network 56Y may be four or larger or two or smaller.

As described above, according to the fourth embodiment, in the communication system 102X in which the communication networks 55X and 56X using different communication protocols are present on one trunk, the communication device 62, which is a boundary station, adjusts the data traffic of broadcast frames that cannot be received in the communication network 56X among the broadcast frames to be transmitted to the communication device 71. In addition, in the communication system 102Y in which the communication networks 55Y and 56Y using different communication protocols are present on one trunk, the communication device 62, which is a boundary station, adjusts the data traffic of broadcast frames that cannot be received in the communication network 56Y among the broadcast frames to be transmitted to the communication device 71.

In other words, the boundary station restricts relay of specific types of broadcast frames from the communication network 55X or 55Y to the communication network 56X or 56Y. In other words, the boundary station filters out specific types of broadcast frames to be transmitted from the communication network 55X or 55Y to the communication network 56X or 56Y. As a result, the specific types of broadcast frames that cannot be received in the communication networks 56X and 56Y are not relayed to the communication devices 71 to 73. This allows the communication device 62 to adjust the data traffic from the communication network 55X or 55Y to the communication network 56X or 56Y, which allows the communication device 62 to avoid the situation where the band in the communication networks 56X and 56Y becomes insufficient due to broadcast frames that cannot be processed in the communication networks 56X and 56Y. Therefore, the communication systems 102X and 102Y can each perform stable communication even though the communication system includes communication networks using different communication protocols. Note that the inventions described in the first to fourth embodiments may be combined.

The configurations presented in the embodiments above are examples of an aspect of the present invention, and can be combined with other known technologies or can be partly omitted or modified without departing from the scope of the present invention.

REFERENCE SIGNS LIST 10A to 10D high-performance communication device; 11, 31 microcomputer; 12, 17, 32 storage unit; 13, control unit; 15 ASIC; 16 connection request frame transmitting unit; 18 relay unit; 30A to 30C low-performance communication device; 51X, 51Y, 52X, 52Y, 55X, 55Y, 56X, 56Y communication network; 61 to 64, 71 to 73 communication device; 100 master station; 101X, 101Y, 102X, 102Y communication system.

The invention claimed is:

1. A communication system comprising:
a plurality of first communication devices located in a first communication network and having a first communication processing performance;
a second communication device located in a second communication network and having a second communication processing performance lower than the first communication processing performance; and
a management device to manage the first communication network and the second communication network, wherein
a boundary device restricts relay of a broadcast frame transmitted and received in the first communication network to the second communication network, the boundary device being one of the first communication devices and being located at a boundary of connection with the second communication device,
the first communication devices transmit first information to the management device, the first information indicating that relay of the broadcast frame is allowed, and
the management device determines the boundary device on a basis of at least the first information and instructs the boundary device to perform the restriction.

2. The communication system according to claim 1, wherein
the boundary device does not relay a broadcast frame transmitted and received in the first communication network to the second communication network by performing filtering of the broadcast frame in the first communication network.

3. The communication system according to claim 2, wherein
the filtering is a process of blocking communication of the broadcast frame, a process of relaying a broadcast frame once every specific number of times a broadcast frame is received, or a process of restricting relay of a specific type of broadcast frame.

4. The communication system according to claim 1, wherein
the boundary device restricts relay of a multicast frame transmitted and received in the second communication network to the first communication network.

5. The communication system according to claim 1, wherein
the second communication device transmits second information to the management device, the second information indicating that relay of the broadcast frame is not allowed, and
the management device determines the boundary device on a basis of the first information and the second information, and instructs the boundary device to perform the restriction.

6. The communication system according to claim 5, wherein
the management device transmits a unicast frame to the second communication device.

7. The communication system according to according claim 1, wherein
the first communication devices include a first microcomputer to control the first communication devices, and a control circuit to control relay of the broadcast frame, and
the second communication device includes a second microcomputer to control the second communication device.

8. A communication system comprising:
a plurality of first communication devices located in a first communication network and having a first communication processing performance;
a second communication device located in a second communication network and having a second communication processing performance lower than the first communication processing performance; and
a management device to manage the first communication network and the second communication network, wherein
a boundary device relays a broadcast frame or a multicast frame transmitted and received in the first communication network to the second communication network only once every two or more times the broadcast frame or the multicast frame is received, the boundary device being one of the first communication devices and being located at a boundary of connection with the second communication device,
the first communication devices transmit first information to the management device, the first information indicating that relay of the broadcast frame or the multicast frame is allowed, and
the management device determines the boundary device on a basis of at least the first information and instructs the boundary device to perform the relay only once every two or more times the broadcast frame or the multicast frame is received.

9. The communication system according to according to claim 8, wherein
the first communication devices include a first microcomputer to control the first communication devices, and a control circuit to control relay of the broadcast frame, and the second communication device includes a second microcomputer to control the second communication device.

10. A communication system comprising:
a plurality of first communication devices located in a first communication network and operating on a first protocol;
a second communication device located in a second communication network and operating on a second protocol; and
a management device to manage the first communication network and the second communication network, wherein
a boundary device restricts relay of a frame transmitted and received in the first communication network to the second communication network, the boundary device being one of the first communication devices and being located at a boundary of connection with the second communication device,
the first communication devices transmit first information to the management device, the first information indicating that relay of the frame is allowed, and
the management device determines the boundary device on a basis of at least the first information and instructs the boundary device to perform the restriction.

11. A communication method comprising:
a setting of performing setting for restricting relay of a broadcast frame transmitted and received in a first communication network to a second communication network;
a first transmitting/receiving of transmitting/receiving, by a plurality of first communication devices located in the first communication network and having a first communication processing performance, a broadcast frame in the first communication network;
a second transmitting/receiving of transmitting/receiving, by a second communication device located in the second communication network and having a second communication processing performance lower than the first communication processing performance, a frame in the second communication network; and
a restricting of restricting, by a boundary device, relay of the broadcast frame transmitted/received in the first communication network to the second communication network, the boundary device being one of the first communication devices and being located at a boundary of connection with the second communication device, wherein
the setting includes:
a first transmitting of transmitting, by the first communication devices, first information to a management device to manage the first communication network and the second communication network, the first information indicating that relay of the broadcast frame is allowed; and
an instructing of determining, by the management device, the boundary device on a basis of at least the first information, and instructing, by the management device, the boundary device to perform the restriction.

* * * * *